United States Patent
Zhou

(10) Patent No.: US 12,513,037 B2
(45) Date of Patent: Dec. 30, 2025

(54) METHOD AND DEVICE FOR DETERMINING VORTEX WAVE PHASE DEVIATION, AND STORAGE MEDIUM

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 475 days.

(21) Appl. No.: 18/010,152

(22) PCT Filed: Jun. 15, 2020

(86) PCT No.: PCT/CN2020/096165
§ 371 (c)(1),
(2) Date: Dec. 13, 2022

(87) PCT Pub. No.: WO2021/253176
PCT Pub. Date: Dec. 23, 2021

(65) Prior Publication Data
US 2023/0269122 A1 Aug. 24, 2023

(51) Int. Cl.
*H04L 27/26* (2006.01)
*H04L 25/08* (2006.01)

(52) U.S. Cl.
CPC .......... *H04L 27/2649* (2013.01); *H04L 25/08* (2013.01)

(58) Field of Classification Search
CPC ...... H04L 27/2649; H04L 25/08; H04L 27/18
See application file for complete search history.

(56) References Cited

U.S. PATENT DOCUMENTS

| | | | |
|---|---|---|---|
| 2016/0198954 A1* | 7/2016 | Wang | A61B 5/0095 600/407 |
| 2017/0126460 A1 | 5/2017 | Dutronc et al. | |
| 2018/0234285 A1* | 8/2018 | Djordjevic | H01Q 21/00 |
| 2021/0028965 A1* | 1/2021 | Dutronc | H04L 27/2338 |
| 2021/0246777 A1* | 8/2021 | Zhao | E21B 47/005 |
| 2022/0385360 A1* | 12/2022 | Lee | H04B 10/11 |

FOREIGN PATENT DOCUMENTS

| | | | | |
|---|---|---|---|---|
| CN | 109449581 A | * | 3/2019 | H01Q 1/50 |
| CN | 109586034 A | * | 4/2019 | H01Q 3/34 |
| JP | 2017224988 A | * | 12/2017 | |
| JP | 6586048 B2 | | 10/2019 | |

OTHER PUBLICATIONS

European Patent Application No. 20941366.5, Search and Opinion dated Feb. 15, 2024, 11 pages.
Indian Patent Application No. 202247077176, Office Action dated Feb. 20, 2023, 5 pages.

* cited by examiner

*Primary Examiner* — Atique Ahmed
(74) *Attorney, Agent, or Firm* — Cozen O'Connor

(57) ABSTRACT

A method for determining a vortex wave phase offset is performed by an access network device. The method includes: determining vortex wave phase offsets used by adjacent access network devices, so as to obtain a first set of vortex wave phase offsets; and determining a target vortex wave phase offset according to the first set of vortex wave phase offsets and a pre-configured set of available vortex wave phase offsets.

19 Claims, 4 Drawing Sheets

METHOD AND DEVICE FOR DETERMINING VORTEX WAVE PHASE DEVIATION, AND STORAGE MEDIUM

CROSS-REFERENCE TO RELATED APPLICATION

This application is the U.S. national phase application of International Application No. PCT/CN2020/096165, filed on Jun. 15, 2020, the entire disclosure of which is incorporated herein by reference.

TECHNICAL FIELD

The disclosure relates to a field of communication technologies, in particular to a method for determining a vortex wave phase offset, an apparatus for determining a vortex wave phase offset, and a storage medium.

BACKGROUND

With the maturation of the 5th generation (5G) standards and products, various technologies for subsequent evolution of 5G have gradually entered the field and have become a research direction of mainstream manufacturers in various countries around the world. Like the evolution of each generation of communication systems, various technologies in the subsequent evolution of 5G may also increase the transmission rate by dozens of times compared to 5G. In order to achieve a huge improvement in indicators such as the transmission rate, some technical solutions have been considered, such as a solution of orbital angular momentum (OAM) (also known as vortex wave).

Based on the characteristics of vortex waves, vortex waves with different phase offsets may be superimposed for transmission in the same frequency band, so as to realize one more dimension of transmission and thus expand the transmission capacity of a communication channel. During the process of using the vortex waves with different phase offsets for transmission, interference between the vortex waves may impact the data transmission.

SUMMARY

According to a first aspect of the disclosure, a method for determining a vortex wave phase offset is perform by an access network device. The method includes:
obtaining a first set of vortex wave phase offsets by determining a vortex wave phase offset used by an adjacent access network device; and
determining a target vortex wave phase offset based on the first set of vortex wave phase offsets and a preconfigured set of available vortex wave phase offsets.

According to a second aspect of the disclosure, a device for determining a vortex wave phase offset is provided. The device includes a processor, and a memory for storing instructions executable by the processor. When the instructions are loaded and executed by the processor, the processor is caused to obtain a first set of vortex wave phase offsets by determining a vortex wave phase offset used by an adjacent access network device; and determine a target vortex wave phase offset based on the first set of vortex wave phase offsets and a preconfigured set of available vortex wave phase offsets.

According to a third aspect of the disclosure, a non-transitory computer readable storage medium is provided. When instructions stored in the computer readable storage medium are executed by a processor, a method for determining a vortex wave phase offset may be implemented. The method includes: obtaining a first set of vortex wave phase offsets by determining a vortex wave phase offset used by an adjacent access network device; and determining a target vortex wave phase offset based on the first set of vortex wave phase offsets and a preconfigured set of available vortex wave phase offsets.

It should be understood that the above general description and the following detailed description are exemplary and explanatory only, which are not restrictive of the present disclosure.

BRIEF DESCRIPTION OF THE DRAWINGS

The accompanying drawings, which are incorporated in and constitute a part of this specification, illustrate embodiments consistent with the disclosure and serve to explain the principles of the disclosure together with the description.

DETAILED DESCRIPTION

Figure 1:
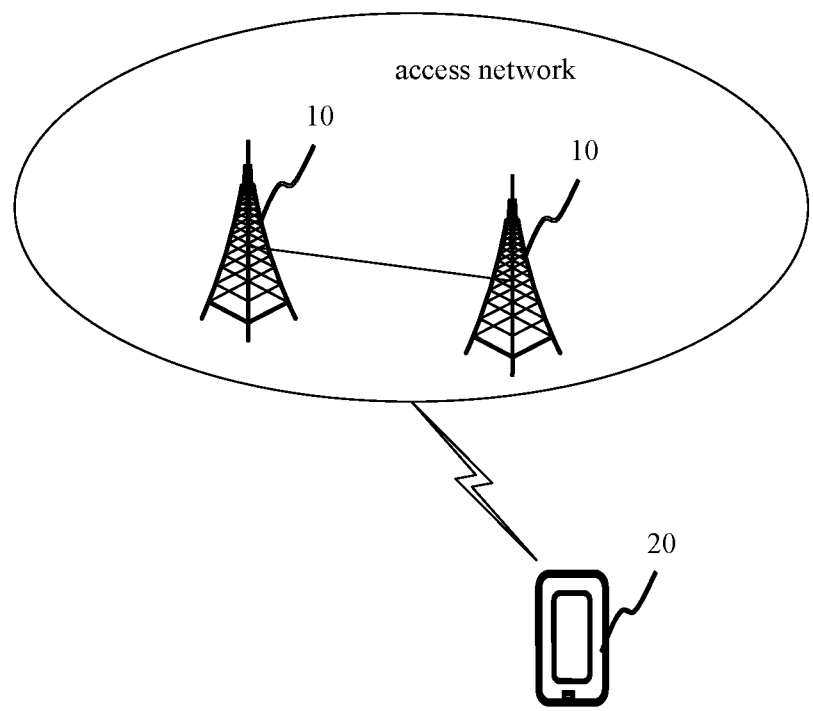
FIG. 1 illustrates a block diagram of a communication system according to an exemplary embodiment.

The exemplary embodiments may be described in detail herein, examples of which are illustrated in the accompanying drawings. Where the following description refers to the drawings, the same numerals in different drawings refer to the same or similar elements unless otherwise indicated. The implementations described in the exemplary embodiments below are not intended to represent all implementations consistent with this disclosure. Rather, they are merely examples of apparatuses and methods consistent with some aspects of the present disclosure as recited in the appended claims.

The terms used in the embodiments of the disclosure are only for the purpose of describing specific embodiments, and are not intended to limit the embodiments of the disclosure. The singular forms of "a" and "the" used in the disclosure and appended claims are also intended to include plural forms, unless the context clearly indicates other meanings. It should also be understood that the term "and/ or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

It should be understood that although the steps are described in a numbered manner for ease of understanding in the embodiments of the disclosure, these numbers do not represent an execution order of the steps, nor do they mean that the sequentially numbered steps must be performed together. It should be understood that, one or several steps among the sequentially numbered steps may be performed separately to solve the corresponding technical problem and achieve a predetermined technical solution. Even though multiple steps are exemplarily listed together in the drawings, it does not mean that the steps must be performed together; the drawings exemplarily list the steps together for ease of understanding.

FIG. 1 is a block diagram illustrating a communication system according to an exemplary embodiment. As illustrated in FIG. 1, the communication system may include: an access network device 10 and a terminal 20.

The access network device 10 is deployed in a wireless access network to provide the terminal 20 with a wireless access function. The access network device may be a base station (BS). The access network device 10 may wirelessly communicate with the terminal 20 via one or more antennas. The access network device 10 may provide a communication coverage for a geographical area where the access network device 10 is located. The base stations may include different types such as macro base stations, micro base stations, relay stations, and access points. In some embodiments, the base station may be referred to by those skilled in the art as a base station transceiver, a wireless base station, an access point, a wireless transceiver, a basic service set (BSS), an extended service set (ESS), a node B (NodeB), an evolved node B (evolved NodeB, eNB or eNodeB) or some other appropriate terms. In an example, the base station in a 5G system is called a gNB. For convenience of description, the above-mentioned devices for providing the terminal 20 with the wireless communication functions are collectively referred to as access network devices in the embodiments of the disclosure.

The terminal 20 may be dispersed throughout the whole mobile communication system, and each terminal 20 may be stationary or mobile. The terminal 20 may also be referred to by those skilled in the art as a mobile station, a subscriber station, a mobile unit, a subscriber unit, a wireless unit, a remote unit, a mobile device, a user equipment (UE), a wireless device, a wireless communication device, a remote device, a mobile subscriber station, a receiver terminal, a mobile terminal, a wireless terminal, a remote terminal, a handheld device, a user agent, a mobile client, a client, or some other appropriate terms. The terminal 20 may be a cellular telephone, a personal digital assistant (PDA), a wireless modem, a wireless communication device, a handheld device, a tablet computer, a laptop computer, a cordless telephone, a wireless local loop (WLL) station, etc. The terminal 20 may communicate with the access network device 10 in the mobile communication system.

The access network device 10 and the terminal 20 may communicate with each other through an air interface technology, for example, through a cellular technology. The communication link between the access network device 10 and the terminal 20 may include: a down link (DL) transmission from the access network device 10 to the terminal 20, and/or an up link (UL) transmission from the terminal 20 to the access network device 10. The DL transmission may also be referred to as a forward link transmission. The UL transmission may also be referred to as a reverse link transmission. In some examples, the DL transmission may include a transmission of a discovery signal, and the discovery signal may include a reference signal and/or a synchronization signal.

The mobile communication system shown in FIG. 1 may be a long term evolution (LTE) system, or a next-generation evolution system based on the LTE system, such as an LTE-advanced (LTE-A) system or a 5G system (also known as a NR system), may also be a next-generation evolution system based on the 5G system, such as a beyond 5th generation (B5G) system, a 6th generation (6G) system and so on. In the embodiments of the disclosure, the terms "system" and "network" are often used interchangeably, but those skilled in the art may understand their meanings.

The communication system and service scenarios described in the embodiments of the disclosure aim at illustrating more clearly the technical solutions of the embodiments of the disclosure, and do not constitute a limitation on the technical solutions according to the embodiments of the disclosure. With the evolution of the communication system and the emergence of new service scenarios, the technical solutions according to the embodiments of the disclosure are also applicable to similar technical problems.

In the embodiment of the disclosure, the access network device has a phased array antenna that may be used to generate a vortex wave, so that the access network device may use the vortex wave for transmission. The phase offset of the vortex wave may be adjusted by adjusting parameters of the phased array antenna. For one access network device, one or more phase-shifted vortex waves may be used for transmission.

Since an identification degree for demodulation is limited to a certain extent, a number of phase offsets that may be identified by the access network device is limited to a certain extent. For example, under the same frequency, the access network device may identify no more than n phase offsets, where for example, n is equal to 8.

In the embodiment of the disclosure, each access network device may be configured with a set of available vortex wave phase offsets. The set of available vortex wave phase offsets includes m vortex wave phase offsets. That is, each access network device has m vortex wave phase offset configuration options. Here, m is determined according to the maximum number of vortex wave phase offsets that may be identified by the access network device at a target frequency. For example, m may be N times n, where N is a positive integer greater than 1. Optionally, N is a positive integer greater than 1 and smaller than 1024, and N is equal to 2X, where X is a positive integer. In an example, N is equal to 2. For example, when n is equal to 8, m is equal to 16.

In the embodiment of the disclosure, the values of m and n may be determined through simulation experiments or laboratory experiments.

When the access network device selects a phase offset used by the transmitted vortex wave from the set of available vortex wave phase offsets, it needs to ensure that the access network device has the most different offset value configurations from a surrounding access network device, so as to reduce the interference caused by the same or similar vortex wave phase offset when the vortex wave is utilized for transmission. Here, the similar vortex wave phase offset means that a phase offset interval between two vortex wave phase offsets is smaller than a set value.

Figure 2:
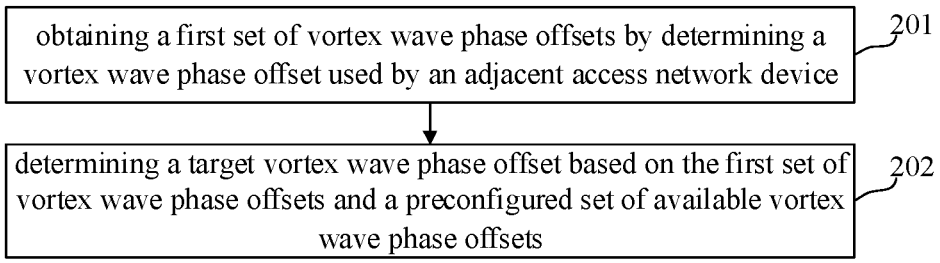
FIG. 2 is a flowchart illustrating a method for determining a vortex wave phase offset according to an exemplary embodiment.

FIG. 2 is a flow chart illustrating a method for determining a vortex wave phase offset according to an exemplary embodiment. The method may be performed by the above access network device. Referring to FIG. 2, the method includes the following steps at 201-202.

At 201, a vortex wave phase offset used by an adjacent access network device is determined to obtain a set of first vortex wave phase offsets.

At 202, a target vortex wave phase offset is determined based on the first set of vortex wave phase offsets and a preconfigured set of available vortex wave phase offsets.

In a possible implementation, determining the target vortex wave phase offset based on the first set of vortex wave phase offsets and the preconfigured set of available vortex wave phase offsets includes:

determining a set of candidate vortex wave phase offsets based on the first set of vortex wave phase offsets and the preconfigured set of available vortex wave phase offsets; and determining the target vortex wave phase offset from the set of candidate vortex wave phase offsets.

Optionally, determining the set of candidate vortex wave phase offsets based on the first set of vortex wave phase offsets and the pre-configured set of available vortex wave phase offsets includes:

determining a difference set between the pre-configured set of available vortex wave phase offsets and the first set of vortex wave phase offsets as the set of candidate vortex wave phase offsets.

Optionally, determining the set of candidate vortex wave phase offsets based on the first set of vortex wave phase offsets and the pre-configured set of available vortex wave phase offsets includes:

obtaining a second set of vortex wave phase offsets by adding into the first set of vortex wave phase offsets, a vortex wave phase offset in the set of available vortex wave phase offsets having an interval from a vortex wave phase offset in the first set of vortex wave phase offsets that is smaller than a phase offset interval threshold; and determining the set of candidate vortex wave phase offsets based on the second set of vortex wave phase offsets.

Optionally, determining the set of candidate vortex wave phase offsets based on the second set of vortex wave phase offsets includes:

determining a difference set between the set of available vortex wave phase offsets and the second set of vortex wave phase offsets as the set of candidate vortex wave phase offsets; or determining the set of candidate vortex wave phase offsets based on the second set of vortex wave phase offsets and a weight corresponding to each vortex wave phase offset in the second set of vortex wave phase offsets, in which a weight corresponding to a vortex wave phase offset in the second set of vortex wave phase offsets that belongs to the first set of vortex wave phase offsets is determined based on a number of times of using the corresponding vortex wave phase offset, a weight corresponding to a vortex wave phase offset in the second set of vortex wave phase offsets that does not belong to the first set of vortex wave phase offsets is equal to 0 or equal to a weight corresponding to an adjacent vortex wave phase offset in the first set of vortex wave phase offsets.

Optionally, determining the set of candidate vortex wave phase offsets based on the second set of vortex wave phase offsets and the weight corresponding to each vortex wave phase offset in the second set of vortex wave phase offsets, includes:

determining the difference set between the set of available vortex wave phase offsets and the second set of vortex wave phase offsets; and obtaining the set of candidate vortex wave phase offsets, by selecting at least part of vortex wave phase offsets having a weight smaller than a weight threshold from the second set of vortex wave phase offsets and adding the at least part of vortex wave phase offsets to the difference set.

Optionally, determining the set of candidate vortex wave phase offsets based on the first set of vortex wave phase offsets and the preconfigured set of available vortex wave phase offsets includes:

determining a difference set between the set of available vortex wave phase offsets and the first set of vortex wave phase offsets; and obtaining the set of candidate vortex wave phase offsets, by updating the difference set based on a weight corresponding to each vortex wave phase offset in the first set of vortex wave phase offsets, in which the weight is configured to indicate a number of times of using the corresponding vortex wave phase offset.

Optionally, obtaining the set of candidate vortex wave phase offsets by updating the difference set based on the weight corresponding to each vortex wave phase offset in the first set of vortex wave phase offsets includes:

obtaining the set of candidate vortex wave phase offsets by adding vortex wave phase offsets in the first set of vortex wave phase offsets in an order of weights from small to large into the difference set, until a number of vortex wave phase offsets in the difference set reaches a target value.

Optionally, determining the target vortex wave phase offset from the set of candidate vortex wave phase offsets includes:

screening out a phase offset having a phase offset interval greater than a phase offset interval threshold from the set of candidate vortex wave phase offsets, as the target vortex wave phase offset.

In another possible implementation, determining the target vortex wave phase offset based on the first set of vortex wave phase offsets and the preconfigured set of available vortex wave phase offsets includes:

determining a weight corresponding to each vortex wave phase offset in the set of available vortex wave phase offsets based on the first set of vortex wave phase offsets; and determining the target vortex wave phase offset based on the weight.

Optionally, determining the weight corresponding to each vortex wave phase offset in the set of available vortex wave phase offsets based on the first set of vortex wave phase offsets includes:

determining a weight corresponding to each vortex wave phase offset in the first set of vortex wave phase offsets based on a number of times of using each vortex wave phase offset in the first set of vortex wave phase offsets;

determining a difference between the weight corresponding to each vortex wave phase offset in the first set of vortex wave phase offsets and a set value as a weight corresponding to an adjacent vortex wave phase offset, in which the adjacent vortex wave phase offset is a vortex wave phase offset in the set of available vortex wave phase offsets having a phase offset interval from a vortex wave phase offset in the first set of vortex wave phase offsets that is smaller than a phase offset interval threshold; and setting a weight corresponding to each of remaining vortex wave phase offsets to 0, in which the remaining vortex wave phase offsets are vortex wave phase offsets in the set of available vortex wave phase offsets other than vortex wave phase offsets in the first set of vortex wave phase offsets and the adjacent vortex wave phase offset.

Optionally, determining the weight corresponding to each vortex wave phase offset in the set of available vortex wave phase offsets based on the first set of vortex wave phase offsets includes:

determining a weight corresponding to each vortex wave phase offset in the first set of vortex wave phase offsets based on a number of times of using each vortex wave phase offset in the first set of vortex wave phase offsets; and setting a weight corresponding to each of remaining vortex wave phase offsets to 0, in which the remaining vortex wave phase offsets are vortex wave phase offsets in the set of available vortex wave phase offsets other than vortex wave phase offsets in the first set of vortex wave phase offsets.

Optionally, determining the vortex wave phase offset used by the adjacent access network device includes at least one of:

receiving vortex wave phase offset configuration information used by the adjacent access network device, and determining the vortex wave phase offset used by the adjacent access network device based on the configuration information, in which the vortex wave phase offset configuration information is configured to indicate a vortex wave phase offset used by an access network device; or receiving the vortex wave phase offset configuration information used by the adjacent access network device through a communication interface with the adjacent access network device, in which the vortex wave phase offset configuration information is configured to indicate a vortex wave phase offset used by an access network device; or determining the vortex wave phase offset used by the adjacent access network device, by measuring the vortex wave phase offset of the adjacent access network device; or determining the vortex wave phase offset used by the adjacent access network device, by measuring the vortex wave phase offset of the adjacent access network device through an air interface.

Optionally, measuring the vortex wave phase offset of the adjacent access network device through the air interface includes:

performing blind detection on a pilot signal of the adjacent access network device based on at least one vortex wave phase offset in the set of available vortex wave phase offsets.

Optionally, a number of vortex wave phase offsets in the set of available vortex wave phase offsets is N times the maximum number of vortex wave phase offsets that the access network device can distinguish at a target frequency, where N is a positive integer greater than 1.

It should be noted that the above steps at 201-202 and the above optional steps may be combined arbitrarily.

Figure 3:
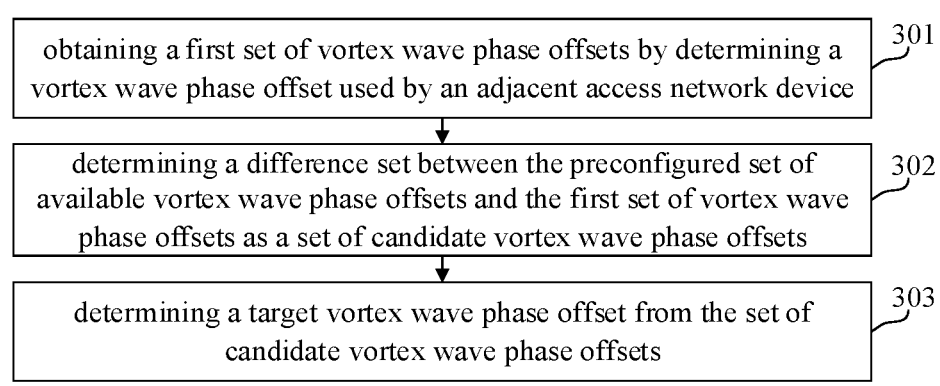
FIG. 3 is a flowchart illustrating a method for determining a vortex wave phase offset according to an exemplary embodiment.

FIG. 3 is a flowchart illustrating a method for determining a vortex wave phase offset according to an exemplary embodiment. The method may be performed by an access network device. Referring to FIG. 3, the method includes the following steps at 301-303.

At 301, the vortex wave phase offset used by the adjacent access network device is determined to obtain a first set of vortex wave phase offsets.

In the embodiment of the disclosure, using by the access network device a certain vortex wave phase offset means that the access network device is configured to enable signal transmission by using the vortex wave phase offset.

In a possible implementation, the step at 301 includes: receiving vortex wave phase offset configuration information used by the adjacent access network device, so that the vortex wave phase offset used by the access network device is determined based on the configuration information. The vortex wave phase offset configuration information used by the adjacent access network device may be received from the adjacent access network device, or may be received from the core network, or may also be determined based on an agreement of a relevant communication protocol. In the embodiments of the disclosure, the way of determining the vortex wave phase offset used by the adjacent access network devices is merely exemplary, which is not limited in the embodiments of the disclosure.

In another possible implementation, the step at 301 includes: receiving, through a communication interface with the adjacent access network device, vortex wave phase offset configuration information used by the adjacent access network device. The phase offset configuration information is configured to indicate the vortex wave phase offset used by the access network device. In an example, the communication interface may be an X2 interface.

In another possible implementation, the step at 301 includes: determining the vortex wave phase offset used by the adjacent access network device by measuring the vortex wave phase offset of the adjacent access network device.

In yet another possible implementation, the step at 301 includes: measuring the vortex wave phase offset of the adjacent access network device through an air interface.

In an example, measuring the vortex wave phase offset of the adjacent access network device through the air interface includes:

performing blind detection on a pilot signal of the adjacent access network device based on at least one vortex wave phase offset in the set of available vortex wave phase offsets.

In this embodiment of the disclosure, the pilot signals of the adjacent access network device may be blindly detected one by one based on some or all of the set of available vortex wave phase offsets. For example, in an order of phase offsets from small to large, the vortex wave corresponding to the phase offset is received by adjusting the parameters of the phased array antenna. When a pilot signal is detected on the received vortex wave, it indicates the vortex wave corresponding to the phase offset have been used by an adjacent access network device. In this embodiment of the disclosure, partial set of available vortex wave phase offsets may be determined from the set of available vortex wave phase offsets and blind detection is performed on the pilot signals of the adjacent access network devices. There are many ways to determine the partial set of available vortex wave phase offsets. For example, the partial set of partially available vortex wave phase offsets is determined based on network conditions and/or load conditions, or based on a protocol, or based on configuration of core network devices or other devices.

At 302, a difference set between the preconfigured set of available vortex wave phase offsets and the first set of vortex wave phase offsets is determined as the set of candidate vortex wave phase offsets.

In this embodiment of the disclosure, preconfiguring means that before the method is executed, the set of available vortex wave phase offsets is configured in the access network device by an upper-layer network element such as a core network device. Preconfiguring may also mean that it is determined through the provisions of the relevant communication protocol.

Through the step 302, it may be achieved that the set of candidate vortex wave phase offsets is determined based on the first set of vortex wave phase offsets and the pre-configured set of available vortex wave phase offsets.

At 303, the target vortex wave phase offset is determined from the set of candidate vortex wave phase offsets.

Optionally, the step at 303 may include: screening out a phase offset whose phase offset interval is greater than a phase offset interval threshold from the set of candidate vortex wave phase offsets, as the target vortex wave phase offset. In this way, it may be avoided intra-cell interference caused when vortex waves with similar phase offsets are used by the access network device for transmission.

For example, for the set of candidate phase offsets {$\alpha 2$, $\alpha 6$, $\alpha 8$, $\alpha 10$, $\alpha 12$, $\alpha 13$, $\alpha 15$, $\alpha 16$}, where either $\alpha 12$ or $\alpha 13$ may be selected due to the small phase offset interval. Similarly, either $\alpha 15$ or $\alpha 16$ may be selected. For example, the final configuration values may be {$\alpha 2$, $\alpha 6$, $\alpha 8$, $\alpha 10$, $\alpha 13$, $\alpha 16$}.

Alternatively, the step at 303 includes: selecting the target vortex wave phase offset in a random manner from the set of candidate vortex wave phase offsets.

After the target vortex wave phase offset is determined, the vortex wave for the target vortex wave phase offset may be used for data transmission.

In a possible implementation, a number of target vortex wave phase offsets is positively correlated with the data transmission volume of the access network device. That is, the more the data transmission volume of the access network device, the larger the number of vortex wave phase offsets to be determined.

Through the step at 303, it may be achieved that the target vortex wave phase offset is determined based on the first set of vortex wave phase offsets and the pre-configured set of available vortex wave phase offsets.

The method in this embodiment may be illustrated below. Assuming that the number of vortex wave phase offsets that may be distinguished by the access network device at the operating frequency is 8 and N is equal to 2. Correspondingly, the number of vortex wave phase offsets in the set of available vortex wave phase offsets is 16. Assuming that the set E0 of available vortex wave phase offsets is {$\alpha 1$, $\alpha 2$, . . . , $\alpha 16$}, the determined first set E1 of vortex wave phase offsets is {$\alpha 1$, $\alpha 3$, $\alpha 4$, $\alpha 6$, $\alpha 7$, $\alpha 9$, $\alpha 10$, $\alpha 13$, $\alpha 14$, $\alpha 16$}. Since the set E2 of candidate vortex wave phase offsets is a difference set between E0 and E1, E2 is {$\alpha 2$, $\alpha 5$, $\alpha 8$, $\alpha 11$, $\alpha 12$, $\alpha 15$}.

In the embodiment of the disclosure, since the set of candidate vortex wave phase offsets is the difference set between the set of available vortex wave phase offsets and the first set of vortex wave phase offsets, the target vortex wave phase offset determined from the set of candidate vortex wave phase offsets does not belong to the first set of vortex wave phase offsets in a case where the intersection set between the set of available vortex wave phase offsets and the first set of vortex wave phase offsets is empty. That is, the target vortex wave phase offset is different from the vortex wave phase offset used by the adjacent access network device. Therefore, using the target vortex wave phase offset to send a signal may avoid the interference caused by using the vortex wave with the same phase offset with the adjacent access network device operating at the same frequency.

Figure 4:
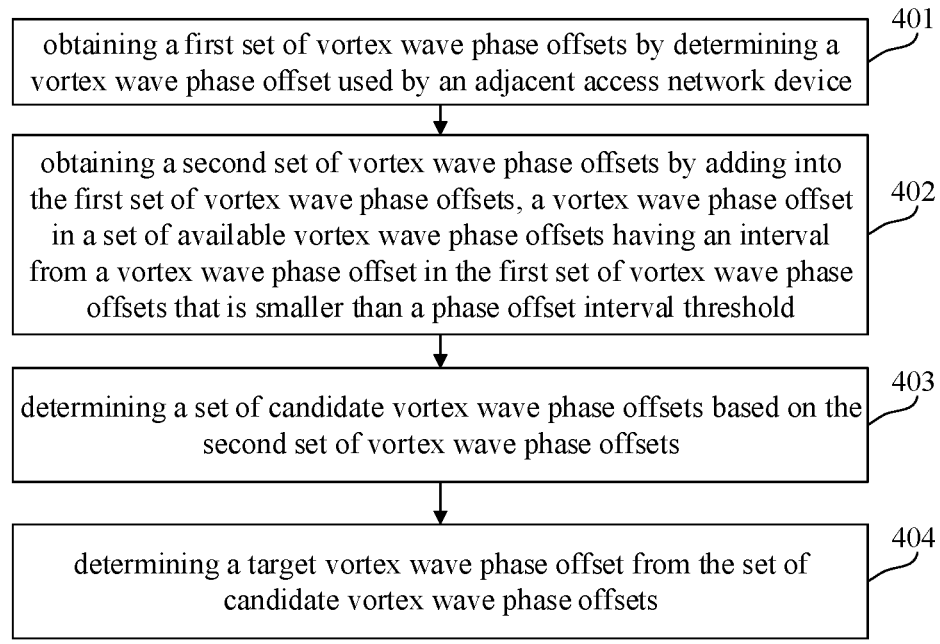
FIG. 4 is a flowchart illustrating a method for determining a vortex wave phase offset according to an exemplary embodiment.

FIG. 4 is a flowchart illustrating a method for determining a vortex wave phase offset according to an exemplary embodiment. The method may be performed by an access network device. Referring to FIG. 4, the method includes the following steps at 401-404.

At 401, the vortex wave phase offset used by the adjacent access network device is determined to obtain a first set of vortex wave phase offsets.

For the related content of the step at 401, reference may be made to the above step at 301, and the detailed description is omitted here.

At 402, a second set of vortex wave phase offsets is obtained by adding into the first set of vortex wave phase offsets, a vortex wave phase offset in the set of available vortex wave phase offsets having an interval from a vortex wave phase offset in the first set of vortex wave phase offsets that is smaller than a phase offset interval threshold.

Here, the phase offset interval threshold is a set value, which may be set based on the minimum phase offset interval between two vortex waves with different phase offsets that may lead to the interference. This is not limited in the disclosure.

In a possible implementation, in the set of available vortex wave phase offsets, the vortex wave phase offset that is adjacent to the vortex wave phase offset in the first set of vortex wave phase offsets may be added to into the first vortex wave phase offset, to obtain the second set of vortex wave phase offsets.

At 403, the set of candidate vortex wave phase offsets is determined based on the second set of vortex wave phase offsets.

In an example, the step at 403 includes: determining a difference set between the set of available vortex wave phase offsets and the second set of vortex wave phase offsets as the set of candidate vortex wave phase offsets.

Through the steps at 402 and 403, it may be achieved that the set of candidate vortex wave phase offsets may be determined based on the first set of vortex wave phase offsets and the pre-configured set of available vortex wave phase offsets.

At 404, the target vortex wave phase offset is determined from the set of candidate vortex wave phase offsets.

For the related content of the step at 404, reference may be made to the above step at 303, and the detailed description is omitted here.

The method in this embodiment may be illustrated below. Assuming that the number of vortex wave phase offsets that may be distinguished by the access network device at the operating frequency is 8 and N is equal to 2. Correspondingly, the number of vortex wave phase offsets in the set of available vortex wave phase offsets is 16. Assuming that the set E0 of available vortex wave phase offsets is {$\alpha 1$, $\alpha 2$, $\alpha 16$}, the determined first set E1 of vortex wave phase offsets is {$\alpha 1$, $\alpha 7$, $\alpha 11$, $\alpha 14$}. Since using a phase offset close to the phase offset in E1 may also lead to the interference, the phase offset close to the phase offset in E1 is added to E1 to obtain the second set E1' of vortex wave phase offsets. E1' is {$\alpha 1$, $\alpha 2$, $\alpha 6$, $\alpha 7$, $\alpha 8$, $\alpha 10$, $\alpha 11$, $\alpha 12$, $\alpha 13$, $\alpha 14$, $\alpha 15$, $\alpha 16$}, where the underlined phase offsets are the phase offsets close to the phase offsets in E1. Therefore, the set E2 of candidate vortex wave phase offsets is the difference set between E0 and E1'. E2 is {$\alpha 3$, $\alpha 4$, $\alpha 5$, $\alpha 9$}.

In the embodiment of the disclosure, the set of candidate vortex wave phase offsets is the difference set between the set of available vortex wave phase offsets and the second set of vortex wave phase offsets, in which the second set of vortex wave phase offsets includes the vortex wave phase offsets already used by the adjacent access network device and the vortex wave phase offsets close to the already used vortex wave phase offsets, in this case, the target vortex wave phase offset determined from the set of candidate vortex wave phase offsets is neither the same nor similar to the vortex wave phase offsets used by the adjacent access network device. Therefore, using the target vortex wave phase offset to send a signal may avoid the interference caused by using the vortex waves with the same and similar phase offsets as the adjacent access network device operating at the same frequency, thus avoiding the possible interference to the maximum extent.

Figure 5:
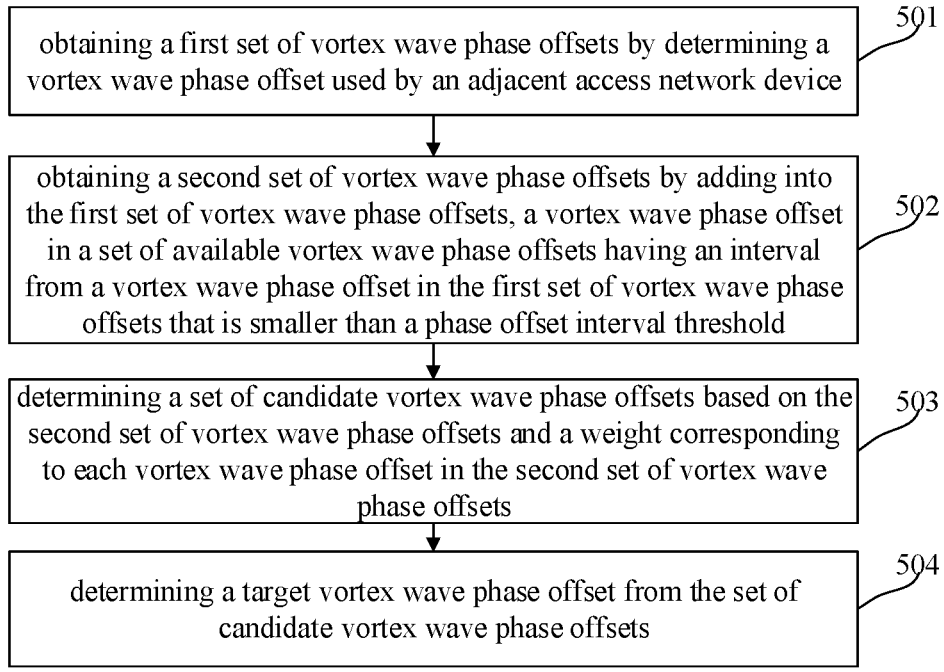
FIG. 5 is a flowchart illustrating a method for determining a vortex wave phase offset according to an exemplary embodiment.

FIG. 5 is a flowchart illustrating a method for determining a vortex wave phase offset according to an exemplary embodiment. The method may be performed by an access network device. Referring to FIG. 5, the method includes the following steps at 501-504.

At 501, the vortex wave phase offset used by the adjacent access network device is determined to obtain a first set of vortex wave phase offsets.

In this embodiment of the disclosure, using a certain vortex wave phase offset by the access network device means that the access network device is configured to enable signal transmission by using a vortex wave with the phase offset. In this embodiment, in addition to determining the vortex wave phase offset used by the adjacent access network device, it also needs to determine a number of times of using each vortex wave phase offset, that is, a number of access network devices that use each vortex wave phase offset.

In a possible implementation, the step at 501 includes: receiving, through a communication interface with the adjacent access network device, vortex wave phase offset configuration information used by the adjacent access network device. The vortex wave phase offset configuration information is configured to indicate the vortex wave phase offset used by an access network device.

Based on the vortex wave phase offset configuration information, the vortex wave phase offset used by the adjacent access network device may be determined, and the times of using each vortex wave phase offset may be counted.

In another possible implementation, the step at 501 includes: measuring the vortex wave phase offset of the adjacent access network device through an air interface.

In an example, measuring the vortex wave phase offset of the adjacent access network device through the air interface includes:

performing blind detection on a pilot signal of the adjacent access network device by using the vortex wave phase offsets in the set of available vortex wave phase offsets one by one.

For example, in an order of phase offsets from small to large, the vortex wave corresponding to the phase offset is received by adjusting the parameters of the phased array antenna. When a pilot signal is detected on the received vortex wave, it indicates the vortex wave with the phase offset has been used by the adjacent access network device.

In this embodiment, for each vortex wave phase offset, the number of times of using the vortex wave phase offset may be determined based on a power level of the received signal during blind detection.

For example, based on a pre-configured correspondence between power levels and the number of times of use, a number of times of use corresponding to the power level of the received signal is determined as the number of times of using the currently detected vortex wave phase offset. In this correspondence, the power levels are positively correlated with the number of times of use, that is, the higher the power level, the greater the number of times of use. Conversely, the lower the power level, the smaller the number of times of use.

At 502, a vortex wave phase offset in the set of available vortex wave phase offsets, whose interval from a vortex wave phase offset in the first set of vortex wave phase offsets is smaller than a phase offset interval threshold, is added to the first set of vortex wave phase offsets to obtain a second set of vortex wave phase offsets.

For the relevant content of the step at 502, reference may be made to the above step at 402, and the detailed description is omitted here.

At 503, the set of candidate vortex waves is determined based on the second set of vortex wave phase offsets and a weight corresponding to each vortex wave phase offset in the second set of vortex wave phase offsets.

In an example, a weight corresponding to a vortex wave phase offset belonging to the first set of vortex wave phase offsets in the second set of vortex wave phase offsets is determined based on the number of times of using the vortex wave phase offset by the adjacent access network device. The more times it is used, the greater the weight. For example, the number of times of using the vortex wave phase offset may be determined as the weight corresponding to the vortex wave phase offset.

In a possible implementation, the weight corresponding to the vortex wave phase offset added to the first set of vortex wave phase offsets (i.e., one in the second set of vortex wave phase offsets that does not belong to the first set of vortex wave phase offsets) is set as a weight corresponding to a similar phase offset in the first set of vortex wave phase offsets (e.g., the phase offset adjacent to the added vortex wave phase offset into the first set of vortex wave phase offsets). Alternatively, the weight corresponding to the added vortex wave phase offset into the first set of vortex wave phase offsets is set to 0.

That is, the set of candidate vortex wave phase offsets is determined based on the second set of vortex wave phase offsets.

The step at 503 may include: determining the difference set between the set of available vortex wave phase offsets and the second set of vortex wave phase offsets; and obtaining the set of candidate vortex wave phase offsets, by selecting at least part of vortex wave phase offsets having a weight smaller than a weight threshold from the second set of vortex wave phase offsets and adding the at least part of vortex wave phase offsets to the difference set.

It should be noted that, the step at 503 may be performed when a number of the target phase offsets are smaller than a target value which corresponds to service needs. That is, the target value corresponds to the amount of data to be transmitted. The larger the amount of data to be transmitted, the larger the target value. Conversely, the smaller the amount of data to be transmitted, the smaller the target value.

At 504, the target vortex wave phase offset is determined from the set of candidate vortex wave phase offsets.

For the related content of the step at 504, reference may be made to the above step at 303, and the detailed description is omitted here.

The method in this embodiment will be illustrated below. Assuming that the number of vortex wave phase offsets that may be distinguished by the access network device at the operating frequency is 8 and N is equal to 2. Correspondingly, the number of vortex wave phase offsets in the set of available vortex wave phase offsets is 16. Assuming that the set E0 of available vortex wave phase offsets is {α1, α2, ..., α16}, the determined first set E1 of vortex wave phase offsets is {α1, α7, α11, α14}. Since using a phase offset close to the phase offset in E1 may also lead to the interference, the phase offset close to the phase offset in E1 is added to E1 to obtain the second set E1' of vortex wave phase offsets. E1' is {α1, α2, α6, α7, α8, α10, α11, α12, α13, α14, α15, α16}, where the underlined phase offsets are the phase offsets close to the phase offsets in E1.

A weight set F1 corresponding to E1 is {4, 2, 2, 1}. That is, α1 is configured 4 times, α7 and all are configured twice, and α14 is configured once. A weight set F1' corresponding to E1' is {4, 0, 0, 2, 0, 0, 2, 0, 0, 1, 0, 0}.

The difference set E2 between E0 and E1' is {α3, α4, α5, α9}. When the number of phase offsets in E2 meets the service needs, E2 is selected as the set of candidate vortex wave phase offsets. When the number of phase offsets in E2 does not meet the needs and there are no needs, at least part of phase offsets with a low weight value (e.g., 0) are added to the difference set E2 to obtain a set E2' of candidate vortex wave phase offsets.

In the embodiment of the disclosure, the set of candidate vortex wave phase offsets is the difference set between the set of available vortex wave phase offsets and the second set of vortex wave phase offsets, in which the second set of vortex wave phase offsets includes the vortex wave phase offsets already used by the adjacent access network device and the vortex wave phase offsets close to the already used vortex wave phase offsets, in this case, the target vortex wave phase offset determined from the set of candidate vortex wave phase offsets is neither the same nor similar to the vortex wave phase offsets used by the adjacent access network device. Therefore, using the target vortex wave phase offset to send a signal may avoid the interference caused by using the vortex waves with the same and similar phase offsets as the adjacent access network device operating at the same frequency, thus avoiding the possible interference to the maximum extent.

In addition, when the number of phase offsets does not meet the service needs, the phase offsets with small weights may also be added to the set of candidate vortex wave phase offsets, thus increasing system capacity and flexibly meeting the service needs.

Figure 6:
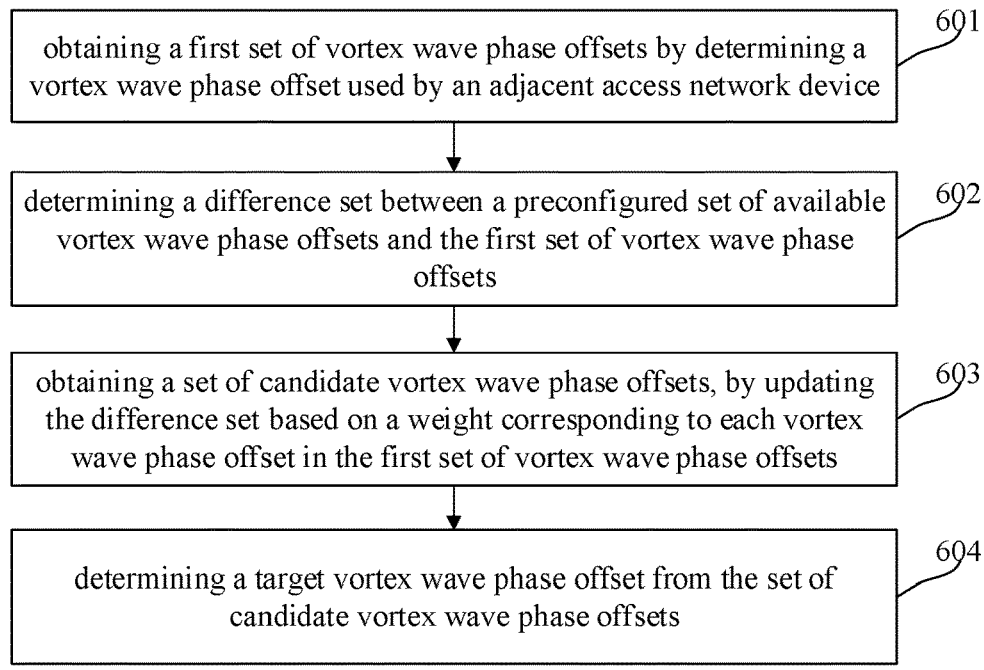
FIG. 6 is a flowchart illustrating a method for determining a vortex wave phase offset according to an exemplary embodiment.

FIG. 6 is a flowchart illustrating a method for determining a vortex wave phase offset according to an exemplary embodiment. The method may be performed by an access network device. Referring to FIG. 6, the method includes the following steps at 601-604.

At 601, the vortex wave phase offset used by the adjacent access network device is determined to obtain a first set of vortex wave phase offsets.

For the related content of the step at 601, reference may be made to the above step 501, and the detailed description is omitted here.

At 602, the difference set between the preconfigured set of available vortex wave phase offsets and the first set of vortex wave phase offsets is determined.

At 603, the difference set is updated based on the weight corresponding to each vortex wave phase offset in the first set of vortex wave phase offsets to obtain the set of candidate vortex wave phase offsets. The weight is configured to indicate a number of times the corresponding vortex wave phase offset is used.

Optionally, the step may include: the set of candidate vortex wave phase offsets is obtained by adding the vortex wave phase offsets in the first set of vortex wave phase offsets to the difference set in an order of weights from small to large into the difference set, until a number of vortex wave phase offsets in the difference set reaches the target value.

For the relevant content of the target value, reference may be made to the step at 503, and the detailed description is omitted here.

At 604, a target vortex wave phase offset is determined from the set of candidate vortex wave phase offsets.

The method in this embodiment will be illustrated below. Assuming that the number of vortex wave phase offsets that may be distinguished by the access network device at the operating frequency is 8 and N is equal to 2. Correspondingly, the number of vortex wave phase offsets in the set of available vortex wave phase offsets is 16. Assuming that the set E0 of available vortex wave phase offsets is {α1, α2, ..., α16}, the determined first set E1 of vortex wave phase offsets is {α1, α3, α4, α6, α7, α9, α10, α13, α14, α16}. The weight set F1 corresponding to E1 is {4, 3, 3, 4, 2, 2, 1, 1, 1, 1}. That is, α1 and α6 are configured 4 times, α3 and α4 are configured 3 times, α7 and α9 is configured twice, α10, α13, α14, and α16 are configured once.

The difference set E2 between E0 and E1 is {α2, α5, α8, α11, α12, α15}. When the number of phase offsets in E2 meets the service needs, E2 is selected as the set of candidate vortex wave phase offsets. When the number of phase offsets in E2 does not meet the needs or there are no needs, at least part of phase offsets with a low weight value (e.g., 1) are added to the difference set E2 to obtain a set E2' of candidate vortex wave phase offsets, E2' are {α2, α5, α8, α10, α11, α12, α13, α14, α15, α16}.

In the embodiment of the disclosure, since the set of candidate vortex wave phase offsets is the difference set between the set of available vortex wave phase offsets and the first set of vortex wave phase offsets, the target vortex wave phase offset determined from the set of candidate vortex wave phase offsets does not belong to the first set of vortex wave phase offsets in a case where the intersection set between the set of available vortex wave phase offsets and the first set of vortex wave phase offsets is empty. That is, the target vortex wave phase offset is different from the vortex wave phase offset used by the adjacent access network device. Therefore, using the target vortex wave phase offset to send a signal may avoid the interference caused by using the vortex wave with the same phase offset with the adjacent access network device operating at the same frequency.

In addition, when the number of phase offsets does not meet the service needs, the phase offsets with small weights may also be added to the set of candidate vortex wave phase offsets, thus increasing system capacity and flexibly meeting the service needs. Also, since the times of using the phase offsets with small weights are small, the possibility of interference is relatively small.

Figure 7:
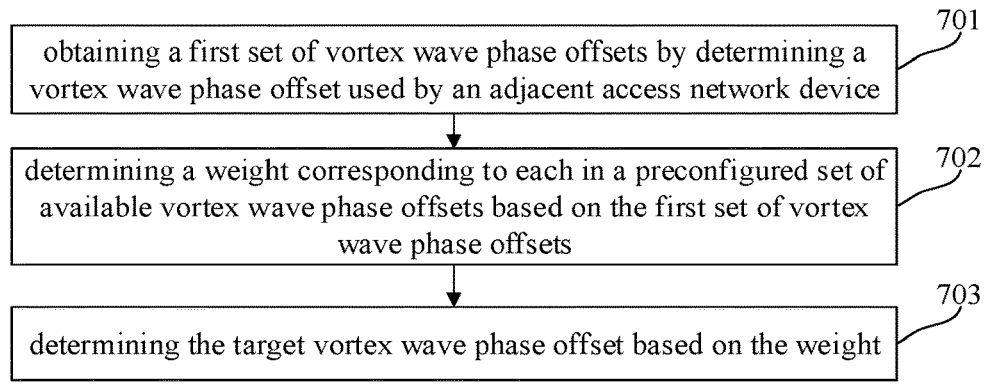
FIG. 7 is a flowchart illustrating a method for determining a vortex wave phase offset according to an exemplary embodiment.

FIG. 7 is a flowchart illustrating a method for determining a vortex wave phase offset according to an exemplary embodiment. The method may be performed by an access network device. Referring to FIG. 7, the method includes the following steps at 701-703.

At 701, the vortex wave phase offset used by the adjacent access network device is determined to obtain a first set of vortex wave phase offsets.

For the related content of the step at 701, reference may be made to the above step 501, and the detailed description is omitted here.

At 702, a weight of each vortex wave phase offset in the preconfigured set of available vortex wave phase offsets is determined based on the first set of vortex wave phase offsets.

The weight is configured to indicate the usage of the corresponding vortex wave phase offset.

In a possible implementation, the weight is determined based on at least one of: a number of times of using the vortex wave phase offset, and a phase interval from the used vortex wave phase offset.

In an example, the size of the weight is positively related to the number of times of using the vortex wave phase offset. That is, the larger the number of times of using the vortex wave phase offset, the larger the corresponding weight of the vortex wave phase offset. The weight size is negatively correlated with the phase interval from the used vortex wave phase offset. That is, the smaller the phase interval from the used vortex wave phase offset, the larger the corresponding weight of the vortex wave phase offsets.

For example, the step at 702 may include:

determining a weight corresponding to each vortex wave phase offset in the first set of vortex wave phase offsets based on a number of times of using each vortex wave phase offset in the first set of vortex wave phase offsets;

determining a difference between the weight corresponding to each vortex wave phase offset in the first set of vortex wave phase offsets and a set value as a weight corresponding to an adjacent vortex wave phase offset, in which the adjacent vortex wave phase offset is a vortex wave phase offset in the set of available vortex wave phase offsets having a phase offset interval from a vortex wave phase offset in the first set of vortex wave phase offsets that is smaller than a phase offset interval threshold;

setting a weight corresponding to each of remaining vortex wave phase offsets to 0, in which the remaining vortex wave phase offsets are vortex wave phase offsets in the set of available vortex wave phase offsets other than vortex wave phase offsets in the first set of vortex wave phase offsets and the adjacent vortex wave phase offset.

In a possible implementation, the set value may be equal to 0 or 1.

For another example, the step at 702 may include:

determining a weight corresponding to each vortex wave phase offset in the first set of vortex wave phase offsets based on a number of times of using each vortex wave phase offset in the first set of vortex wave phase offsets; and setting a weight corresponding to each of remaining vortex wave phase offsets to 0, in which the remaining vortex wave phase offsets are vortex wave phase offsets in the set of available vortex wave phase offsets other than vortex wave phase offsets in the first set of vortex wave phase offsets.

At 703, the target vortex wave phase offset is determined based on the weight.

Optionally, the step at 703 may include: determining the target vortex wave phase offsets in an order of weights from small to large into the difference set, until the determined number of target vortex wave phase offsets reaches the target value. For the relevant content of the target value, reference may be made to the step at 503, and the detailed description is omitted here.

The method in this embodiment will be illustrated below. Assuming that the number of vortex wave phase offsets that may be distinguished by the access network device at the operating frequency is 8 and N is equal to 2. Correspondingly, the number of vortex wave phase offsets in the set of available vortex wave phase offsets is 16. Assuming that the set E0 of available vortex wave phase offsets is $\{\alpha 1, \alpha 2, \ldots, \alpha 16\}$, the determined first set E1 of vortex wave phase offsets is $\{\alpha 1, \alpha 3, \alpha 4, \alpha 6, \alpha 7, \alpha 9, \alpha 10, \alpha 13, \alpha 14, \alpha 16\}$, where $\alpha 1$ and $\alpha 6$ are configured 4 times, $\alpha 3$ and $\alpha 4$ are configured 3 times, $\alpha 7$ and $\alpha 9$ are configured twice, and $\alpha 10, \alpha 13, \alpha 14$, and $\alpha 16$ are configured once. The weights are set for the phase offsets in E0 based on E1, and the weight set F0 is obtained, F0 is $\{4, 0, 3, 3, 0, 4, 2, 0, 2, 1, 0, 0, 1, 1, 0, 1\}$. The target vortex wave phase offset is determined based on the order of the weights from small to large.

In the embodiment of the disclosure, the weight of each vortex wave phase offset in the set of available vortex wave phase offsets is determined based on the vortex wave phase offsets that has been used by adjacent access network devices, so that the weight may indicate the usage of the vortex wave phase offsets, and the target vortex wave phase offset may be then determined based on the usage of the vortex wave phase offsets. As such, the target vortex wave phase offset may keep away from the used vortex wave phase offsets as much as possible, thus reducing the interference caused by the phase offset when vortex waves are used for transmission.

In addition, the desired number of target phase offsets may be determined based on the service needs, and the desired number of vortex wave phase offsets may be selected based on the weights of the vortex wave phase offsets, thus increasing system capacity and flexibly meeting the service needs.

Figure 8:
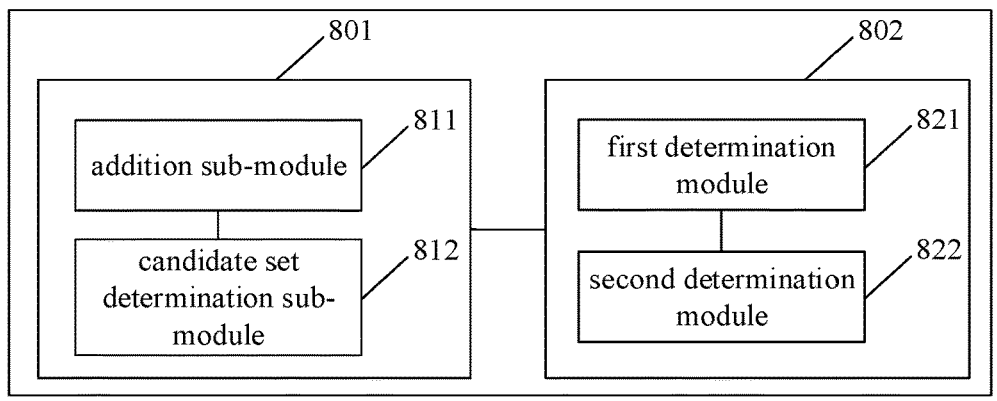
FIG. 8 is a structural schematic diagram illustrating an apparatus for determining a vortex wave phase offset according to an exemplary embodiment.

FIG. 8 is a structural schematic diagram illustrating an apparatus for determining a vortex wave phase offset according to an exemplary embodiment. The apparatus has a function of implementing the access network device in the above method embodiments, and the function may be implemented in hardware or implemented by executing corresponding software in hardware. As shown in FIG. 8, the apparatus includes: a first determination module 801 and a second determination module 802. The first determining module 801 is configured to obtain a first set of vortex wave phase offsets by determining a vortex wave phase offset used by an adjacent access network device. The second determining module 802 is configured to determine a target vortex wave phase offset based on the first set of vortex wave phase offsets and a preconfigured set of available vortex wave phase offsets.

Optionally, the second determining module 802 includes:

a first determination sub-module 821, configured to determine a set of candidate vortex wave phase offsets based on the first set of vortex wave phase offsets and the preconfigured set of available vortex wave phase offsets; and a second determining sub-module 822, configured to determine the target vortex wave phase offset from the set of candidate vortex wave phase offsets.

Optionally, the first determination sub-module 821 is configured to determine a difference set between the preconfigured set of available vortex wave phase offsets and the first set of vortex wave phase offsets as the set of candidate vortex wave phase offsets.

Optionally, the first determination sub-module 821 includes:

an addition sub-module 8211, configured to obtain a second set of vortex wave phase offsets by adding into the first set of vortex wave phase offsets, a vortex wave phase offset in the set of available vortex wave phase offsets having an interval from a vortex wave phase offset in the first set of vortex wave phase offsets that is smaller than a phase offset interval threshold; and a candidate set determination sub-module 8212, configured to determine the set of candidate vortex wave phase offsets based on the second set of vortex wave phase offsets.

Optionally, the candidate set determination sub-module 8212 is configured to determine a difference set between the set of available vortex wave phase offsets and the second set of vortex wave phase offsets as the set of candidate vortex wave phase offsets; or determine the set of candidate vortex wave phase offsets based on the second set of vortex wave phase offsets and a weight corresponding to each vortex wave phase offset in the second set of vortex wave phase offsets, in which a weight corresponding to a vortex wave phase offset in the second set of vortex wave phase offsets that belongs to the first set of vortex wave phase offsets is determined based on a number of times of using the corresponding vortex wave phase offset, a weight corresponding to a vortex wave phase offset in the second set of vortex wave phase offsets that does not belong to the first set of vortex wave phase offsets is equal to 0 or equal to a weight corresponding to an adjacent vortex wave phase offset in the first set of vortex wave phase offsets.

Optionally, the candidate set determination sub-module 8212 is configured to determine the set of candidate vortex wave phase offsets based on the second set of vortex wave phase offsets and the weight corresponding to each vortex wave phase offset in the second set of vortex wave phase offsets by ways of: determining the difference set between the set of available vortex wave phase offsets and the second set of vortex wave phase offsets; and obtaining the set of candidate vortex wave phase offsets, by selecting at least part of vortex wave phase offsets having a weight smaller than a weight threshold from the second set of vortex wave phase offsets and adding the at least part of vortex wave phase offsets to the difference set.

Optionally, the first determination sub-module 821 is configured to determine a difference set between the set of available vortex wave phase offsets and the first set of vortex wave phase offsets; and obtain the set of candidate vortex wave phase offsets, by updating the difference set based on a weight corresponding to each vortex wave phase offset in the first set of vortex wave phase offsets, in which the weight is configured to indicate a number of times of using the corresponding vortex wave phase offset.

Optionally, the first determination sub-module 821 is configured to obtain the set of candidate vortex wave phase offsets by adding vortex wave phase offsets in the first set of vortex wave phase offsets in an order of weights from small to large into the difference set, until a number of vortex wave phase offsets in the difference set reaches a target value.

Optionally, the second determination sub-module 822 is configured to screen out a phase offset having a phase offset interval greater than a phase offset interval threshold from the set of candidate vortex wave phase offsets, as the target vortex wave phase offset.

Optionally, the second determination module 802 is configured to determine a weight corresponding to each vortex wave phase offset in the set of available vortex wave phase offsets based on the first set of vortex wave phase offsets; and determine the target vortex wave phase offset based on the weight.

Optionally, the second determination module 802 is configured to determine the weight corresponding to each vortex wave phase offset in the set of available vortex wave phase offsets by ways of:

determining a weight corresponding to each vortex wave phase offset in the first set of vortex wave phase offsets based on a number of times of using each vortex wave phase offset in the first set of vortex wave phase offsets;

determining a difference between the weight corresponding to each vortex wave phase offset in the first set of vortex wave phase offsets and a set value as a weight corresponding to an adjacent vortex wave phase offset, in which the adjacent vortex wave phase offset is a vortex wave phase offset in the set of available vortex wave phase offsets having a phase offset interval from a vortex wave phase offset in the first set of vortex wave phase offsets that is smaller than a phase offset interval threshold; and setting a weight corresponding to each of remaining vortex wave phase offsets to 0, in which the remaining vortex wave phase offsets are vortex wave phase offsets in the set of available vortex wave phase offsets other than vortex wave phase offsets in the first set of vortex wave phase offsets and the adjacent vortex wave phase offset.

Optionally, the second determination module 802 is configured to determine the weight corresponding to each vortex wave phase offset in the set of available vortex wave phase offsets by ways of:

determining a weight corresponding to each vortex wave phase offset in the first set of vortex wave phase offsets based on a number of times of using each vortex wave phase offset in the first set of vortex wave phase offsets; and setting a weight corresponding to each of remaining vortex wave phase offsets to 0, in which the remaining vortex wave phase offsets are vortex wave phase offsets in the set of available vortex wave phase offsets other than vortex wave phase offsets in the first set of vortex wave phase offsets.

Optionally, the first determination module 801 is configured to determine the vortex wave phase offset used by the adjacent access network device by at least one of:

receiving vortex wave phase offset configuration information used by the adjacent access network device, and determining the vortex wave phase offset used by the adjacent access network device based on the configuration information, in which the vortex wave phase offset configuration information is configured to indicate a vortex wave phase offset used by an access network device; or receiving the vortex wave phase offset configuration information used by the adjacent access network device through a communication interface with the adjacent access network device, in which the vortex wave phase offset configuration information is configured to indicate a vortex wave phase offset used by an access network device; or determining the vortex wave phase offset used by the adjacent access network device, by measuring the vortex wave phase offset of the adjacent access network device; or determining the vortex wave phase offset used by the adjacent access network device, by measuring the vortex wave phase offset of the adjacent access network device through an air interface.

Optionally, the first determination module 801 is configured to perform blind detection on a pilot signal of the adjacent access network device based on at least one vortex wave phase offset in the set of available vortex wave phase offsets.

Optionally, a number of vortex wave phase offsets in the set of available vortex wave phase offsets is N times the maximum number of vortex wave phase offsets that the access network device can distinguish at a target frequency, where N is a positive integer greater than 1.

Figure 9:
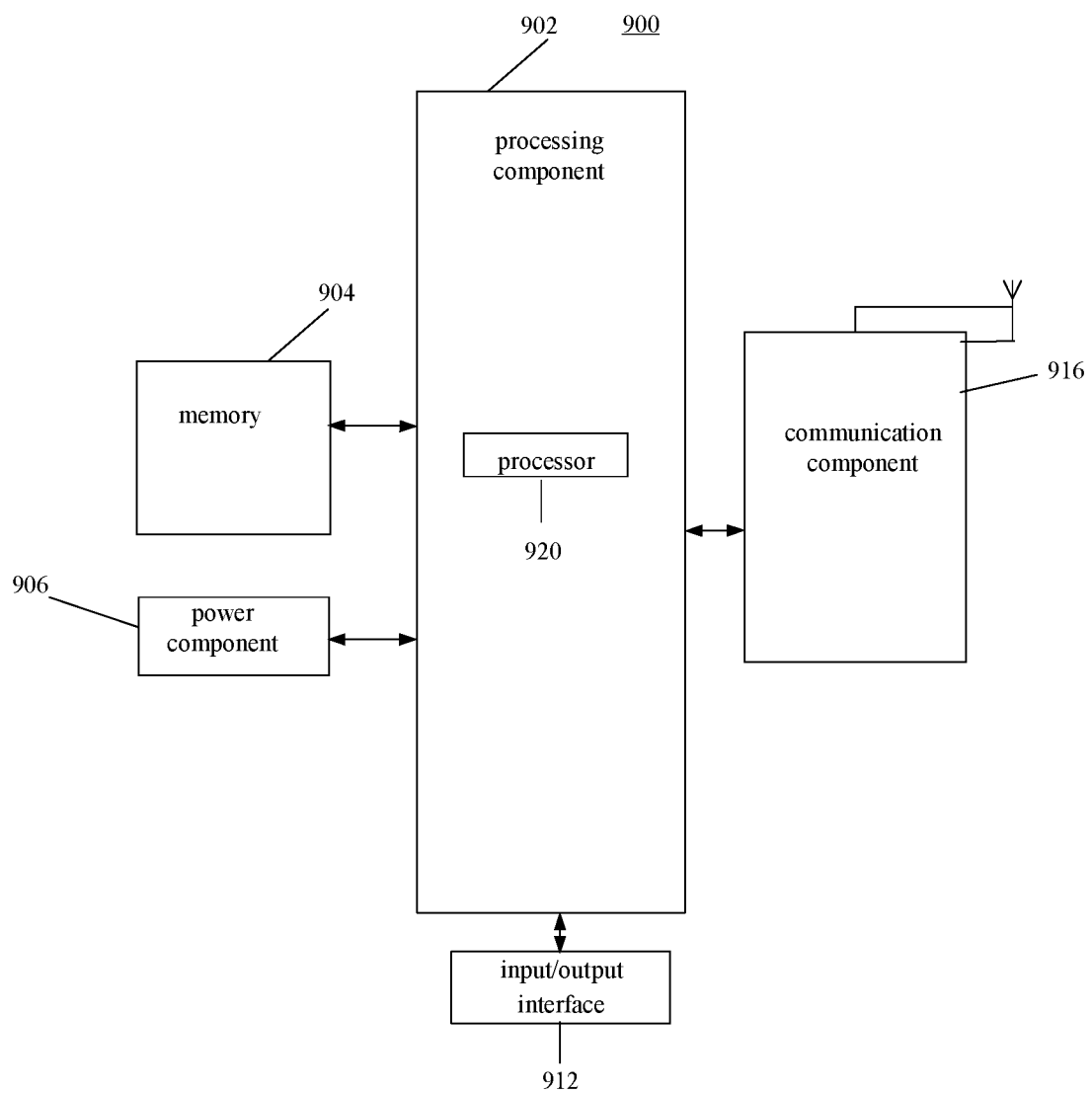
FIG. 9 is a block diagram illustrating a device for determining a vortex wave phase offset according to an exemplary embodiment.

FIG. 9 is a block diagram illustrating a device 900 for determining a vortex wave phase offset according to an exemplary embodiment. The device 900 may be the aforementioned access network device. Referring to FIG. 9, the device 900 for determining a vortex wave phase offset may include one or more of the following components: a processing component 902, a memory 904, a power component 906, an input/output (I/O) interface 912, and a communication component 916.

The processing component 902 generally controls overall operations of the device 900 for determining a vortex wave phase offset, such as operations associated with display, telephone calls, data communications, camera operations, and recording operations. The processing component 902 may include one or more processors 920 to execute instructions to perform all or part of the steps in the methods described above. Additionally, the processing component 902 may include one or more modules to facilitate interactions between the processing component 902 and other components. For example, the processing component 902 may include a multimedia module to facilitate interactions between the multimedia component 908 and the processing component 902.

The memory 904 is configured to store various types of data to support operations of the device 900 for determining a vortex wave phase offset. The memory 904 may be implemented by any type of volatile or non-volatile storage device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic or an optical disk.

The power component 906 provides power to various components of the device 900 for determining a vortex wave phase offset. The power component 906 may include a power management system, one or more power sources, and other components associated with generating, managing, and distributing power to the device 900 for determining a vortex wave phase offset.

The I/O interface 912 provides an interface between the processing component 902 and a peripheral interface module, which may be a keyboard, a click wheel, a button, or the like. These buttons may include, but are not limited to: a home button, a volume button, a start button, and a lock button.

The communication component 916 is configured to facilitate wireless communication between access network devices and other devices. In the embodiment of the disclosure, the communication component 916 may provide a wireless network based on a communication standard, such as 2G, 3G, 4G or 5G, or their combination, so as to connect with the terminal device.

In an exemplary embodiment, the device 900 for determining a vortex wave phase offset may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor, or other electronic components, for implementing the above-mentioned method for determining a vortex wave phase offset.

In an exemplary embodiment, a non-transitory computer readable storage medium including instructions is also provided, such as the memory 904 including instructions. The above-mentioned instructions may be executed by the processor 920 of the device 900 for determining a vortex wave phase offset. For example, the non-transitory computer-readable storage medium may be the ROM, a random access memory (RAM), a CD-ROM, a magnetic tape, a floppy disk, an optical data storage device, and the like.

The exemplary embodiment of the disclosure also provides a communication system, which includes an access network device and a terminal. The access network device is the device for determining a vortex wave phase offset according to the embodiment shown in FIG. 9.

Other embodiments of the disclosure may be apparent to those skilled in the art from consideration of the specification and practice of the disclosure disclosed here. This application is intended to cover any variations, uses, or adaptations of the disclosure following the general principles and including such departures from the disclosure as come within known or customary practice in the art. It is intended that the specification and examples be considered as exemplary only, with a true scope and spirit of the disclosure being indicated by the following claims.

It should be understood that, the disclosure is not limited to the exact construction that has been described above and illustrated in the accompanying drawings, and that various modifications and changes can be made without departing from the scope. It is intended that the scope of the disclosure only be limited by the appended claims.

What is claimed is:

1. A method for determining a vortex wave phase offset, perform by an access network device, comprising:
    obtaining a first set of vortex wave phase offsets by determining a vortex wave phase offset used by an adjacent access network device; and
    determining a target vortex wave phase offset based on the first set of vortex wave phase offsets and a preconfigured set of available vortex wave phase offsets;
    wherein a number of vortex wave phase offsets in the preconfigured set of available vortex wave phase offsets is N times a maximum number of vortex wave phase offsets that the access network device can distinguish at a target frequency, where N is a positive integer greater than 1.

2. The method of claim 1, wherein determining the target vortex wave phase offset based on the first set of vortex wave phase offsets and the preconfigured set of available vortex wave phase offsets comprises:
    determining a set of candidate vortex wave phase offsets based on the first set of vortex wave phase offsets and the preconfigured set of available vortex wave phase offsets; and
    determining the target vortex wave phase offset from the set of candidate vortex wave phase offsets.

3. The method of claim 2, wherein determining the set of candidate vortex wave phase offsets based on the first set of vortex wave phase offsets and the preconfigured set of available vortex wave phase offsets comprises:
    determining a difference set between the preconfigured set of available vortex wave phase offsets and the first set of vortex wave phase offsets as the set of candidate vortex wave phase offsets.

4. The method of claim 2, wherein determining the set of candidate vortex wave phase offsets based on the first set of vortex wave phase offsets and the preconfigured set of available vortex wave phase offsets comprises:
    obtaining a second set of vortex wave phase offsets by adding into the first set of vortex wave phase offsets, a vortex wave phase offset in the preconfigured set of available vortex wave phase offsets having an interval from a vortex wave phase offset in the first set of vortex wave phase offsets that is smaller than a phase offset interval threshold; and determining the set of candidate vortex wave phase offsets based on the second set of vortex wave phase offsets.

5. The method of claim 4, wherein determining the set of candidate vortex wave phase offsets based on the second set of vortex wave phase offsets comprises at least one of:

determining a difference set between the preconfigured set of available vortex wave phase offsets and the second set of vortex wave phase offsets as the set of candidate vortex wave phase offsets; or determining the set of candidate vortex wave phase offsets based on the second set of vortex wave phase offsets and a weight corresponding to each vortex wave phase offset in the second set of vortex wave phase offsets, wherein a weight corresponding to a vortex wave phase offset in the second set of vortex wave phase offsets that belongs to the first set of vortex wave phase offsets is determined based on a number of times of using the corresponding vortex wave phase offset, a weight corresponding to a vortex wave phase offset in the second set of vortex wave phase offsets that does not belong to the first set of vortex wave phase offsets is equal to 0 or equal to a weight corresponding to an adjacent vortex wave phase offset in the first set of vortex wave phase offsets.

6. The method of claim 5, wherein determining the set of candidate vortex wave phase offsets based on the second set of vortex wave phase offsets and the weight corresponding to each vortex wave phase offset in the second set of vortex wave phase offsets comprises:

determining the difference set between the preconfigured set of available vortex wave phase offsets and the second set of vortex wave phase offsets; and obtaining the set of candidate vortex wave phase offsets, by selecting at least part of vortex wave phase offsets having a weight smaller than a weight threshold from the second set of vortex wave phase offsets and adding the at least part of vortex wave phase offsets to the difference set.

7. The method of claim 2, wherein determining the set of candidate vortex wave phase offsets based on the first set of vortex wave phase offsets and the preconfigured set of available vortex wave phase offsets comprises:

determining a difference set between the preconfigured set of available vortex wave phase offsets and the first set of vortex wave phase offsets; and obtaining the set of candidate vortex wave phase offsets, by updating the difference set based on a weight corresponding to each vortex wave phase offset in the first set of vortex wave phase offsets, wherein the weight is configured to indicate a number of times of using the corresponding vortex wave phase offset.

8. The method of claim 7, wherein obtaining the set of candidate vortex wave phase offsets by updating the difference set based on the weight corresponding to each vortex wave phase offset in the first set of vortex wave phase offsets comprises:

obtaining the set of candidate vortex wave phase offsets by adding vortex wave phase offsets in the first set of vortex wave phase offsets in an order of weights from small to large into the difference set, until a number of vortex wave phase offsets in the difference set reaches a target value.

9. The method of claim 2, wherein determining the target vortex wave phase offset from the set of candidate vortex wave phase offsets comprises:

screening out a phase offset having a phase offset interval greater than a phase offset interval threshold from the set of candidate vortex wave phase offsets, as the target vortex wave phase offset.

10. The method of claim 1, wherein determining the target vortex wave phase offset based on the first set of vortex wave phase offsets and the preconfigured set of available vortex wave phase offsets comprises:

determining a weight corresponding to each vortex wave phase offset in the preconfigured set of available vortex wave phase offsets based on the first set of vortex wave phase offsets; and determining the target vortex wave phase offset based on the weight.

11. The method of claim 10, wherein determining the weight corresponding to each vortex wave phase offset in the preconfigured set of available vortex wave phase offsets based on the first set of vortex wave phase offsets comprises:

determining a weight corresponding to each vortex wave phase offset in the first set of vortex wave phase offsets based on a number of times of using each vortex wave phase offset in the first set of vortex wave phase offsets;

determining a difference between the weight corresponding to each vortex wave phase offset in the first set of vortex wave phase offsets and a set value as a weight corresponding to an adjacent vortex wave phase offset, wherein the adjacent vortex wave phase offset is a vortex wave phase offset in the preconfigured set of available vortex wave phase offsets having a phase offset interval from a vortex wave phase offset in the first set of vortex wave phase offsets that is smaller than a phase offset interval threshold; and setting a weight corresponding to each of remaining vortex wave phase offsets to 0, wherein the remaining vortex wave phase offsets are vortex wave phase offsets in the preconfigured set of available vortex wave phase offsets other than vortex wave phase offsets in the first set of vortex wave phase offsets and the adjacent vortex wave phase offset.

12. The method of claim 10, wherein determining the weight corresponding to each vortex wave phase offset in the preconfigured set of available vortex wave phase offsets based on the first set of vortex wave phase offsets comprises:

determining a weight corresponding to each vortex wave phase offset in the first set of vortex wave phase offsets based on a number of times of using each vortex wave phase offset in the first set of vortex wave phase offsets; and setting a weight corresponding to each of remaining vortex wave phase offsets to 0, wherein the remaining vortex wave phase offsets are vortex wave phase offsets in the preconfigured set of available vortex wave phase offsets other than vortex wave phase offsets in the first set of vortex wave phase offsets.

13. The method of claim 1, wherein determining the vortex wave phase offset used by the adjacent access network device comprises at least one of:

receiving vortex wave phase offset configuration information used by the adjacent access network device, and determining the vortex wave phase offset used by the adjacent access network device based on the vortex wave phase offset configuration information, wherein the vortex wave phase offset configuration information is configured to indicate a vortex wave phase offset used by an access network device; or receiving the vortex wave phase offset configuration information used by the adjacent access network device through a communication interface with the adjacent access network device, wherein the vortex wave phase offset configuration information is configured to indicate a vortex wave phase offset used by an access network device; or determining the vortex wave phase offset used by the adjacent access network device, by measuring the vortex wave phase offset of the adjacent access network device; or determining the vortex wave phase offset used by the adjacent access network device, by measuring the vortex wave phase offset of the adjacent access network device through an air interface.

14. The method of claim 13, wherein measuring the vortex wave phase offset of the adjacent access network device through the air interface comprises:

performing blind detection on a pilot signal of the adjacent access network device based on at least one vortex wave phase offset in the preconfigured set of available vortex wave phase offsets.

15. A device for determining a vortex wave phase offset, the device comprising:

a processor; and a memory for storing instructions executable by the processor;

wherein when the instructions are loaded and executed by the processor, the processor is caused to:

obtain a first set of vortex wave phase offsets by determining a vortex wave phase offset used by an adjacent access network device; and determine a target vortex wave phase offset based on the first set of vortex wave phase offsets and a preconfigured set of available vortex wave phase offsets;

wherein a number of vortex wave phase offsets in the preconfigured set of available vortex wave phase offsets is N times a maximum number of vortex wave phase offsets that the access network device can distinguish at a target frequency, where N is a positive integer greater than 1.

16. The device of claim 15, wherein the processor is further caused to:

determine a set of candidate vortex wave phase offsets based on the first set of vortex wave phase offsets and the preconfigured set of available vortex wave phase offsets; and determine the target vortex wave phase offset from the set of candidate vortex wave phase offsets.

17. The device of claim 16, wherein the processor is further caused to:

determine a difference set between the preconfigured set of available vortex wave phase offsets and the first set of vortex wave phase offsets as the set of candidate vortex wave phase offsets.

18. The device of claim 16, wherein the processor is further caused to:

obtain a second set of vortex wave phase offsets by adding into the first set of vortex wave phase offsets, a vortex wave phase offset in the preconfigured set of available vortex wave phase offsets having an interval from a vortex wave phase offset in the first set of vortex wave phase offsets that is smaller than a phase offset interval threshold; and determine the set of candidate vortex wave phase offsets based on the second set of vortex wave phase offsets.

19. A non-transitory computer readable storage medium, wherein when instructions in the computer readable storage medium are executed by a processor, a method for determining a vortex wave phase offset is implemented, the method comprising:

obtaining a first set of vortex wave phase offsets by determining a vortex wave phase offset used by an adjacent access network device; and determining a target vortex wave phase offset based on the first set of vortex wave phase offsets and a preconfigured set of available vortex wave phase offsets;

wherein a number of vortex wave phase offsets in the preconfigured set of available vortex wave phase offsets is N times a maximum number of vortex wave phase offsets that the access network device can distinguish at a target frequency, where N is a positive integer greater than 1.

* * * * *